Jan. 14, 1936.    O. SCHWARZBACH    2,027,885
BUILDING ELEMENT FOR CONSTRUCTIONAL GAMES
Filed March 18, 1935
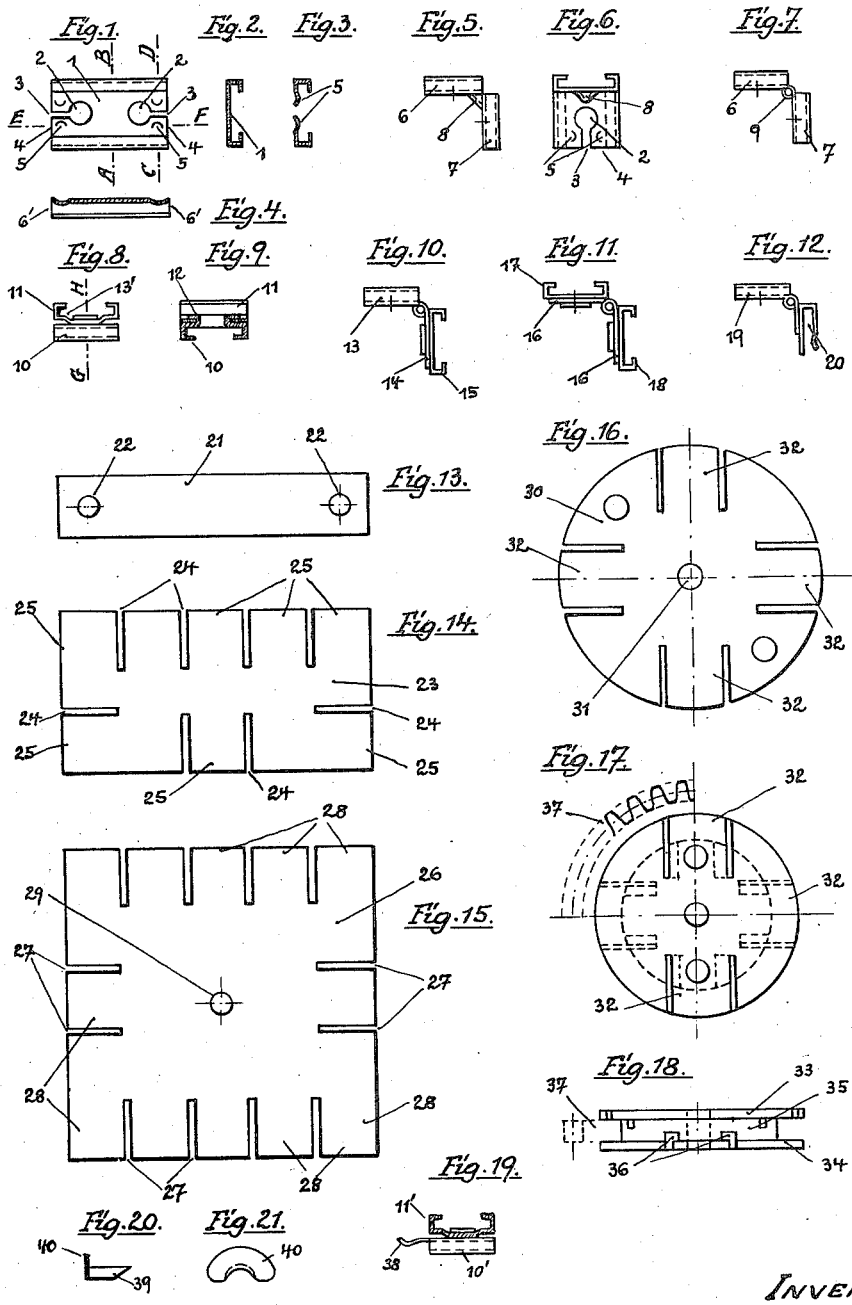
Inventor
Oscar Schwarzbach
by [signature]
Atty Patented Jan. 14, 1936

2,027,885

UNITED STATES PATENT OFFICE 2,027,885

BUILDING ELEMENT FOR CONSTRUCTIONAL GAMES

Oscar Schwarzbach, Bautzen, Germany, assignor to the firm Frapido Spielwarenfabrik Alfred Kranz, Cologne-Ehrenfeld, Germany Application March 18, 1935, Serial No. 11,714 In Germany March 6, 1933

7 Claims. (Cl. 46—23)

The invention relates to a particular form of C shaped connecting member for constructional games.

According to the invention such connecting members are slit at the ends of the cross piece in the longitudinal direction of the member and are provided at the sides of the slits with projections. These connecting members, which are easily and cheaply produced in one piece, are provided with enlarged openings which facilitate the introduction of bars and thus protect the bars. The connecting members fit on the bars with great holding power because the cross pieces are resilient due to the slitting in the ends and press resiliently against the bar inserted in the connecting member. The ends of the cross pieces which are resilient in themselves do not so easily become fatigued, so that the connecting members possess a longer life. The construction is preferably arranged so that the slits provided in the ends of the cross piece run into holes. These holes are used to take cylindrical or rod shaped members and since to a certain extent they are cut behind the ends they increase the resiliency of these ends. The C shaped connecting members in accordance with the invention may be connected together or to other connecting members either rigidly, hingedly, pivotally or the like.

The connecting members, plates, bars, etc. may be made wholly or partly of pasteboard, papier mâché, synthetic resin, wood or other materials of such a kind that the plates and bars can be painted with water colours, coloured pencils or the like in order to increase the fun of the game and afterwards washed clean.

The object of the invention is illustrated by exemplary constructions in the attached drawing in Figures 1 to 21.

Figures 1 to 4 show a connecting member 1, which has a C shaped cross section in accordance with the section A—B (Fig. 2) so that the connecting member, which is to be used as a slide, can grip round all four sides of a rectangular cross sectioned bar inserted therein. On the connecting member 1 slits 3 are provided which run into the holes 2. Thus four intrinsically resilient end parts 4 are formed on the connecting member 1. Projections 5 are provided at the sides of the slits 3 in these parts 4. Figure 3 shows a section on the line C—D of Figure 1 and in which the projections 5 can be recognized. A building element inserted in the relatively large openings 6' in the connecting member 1 is held firmly in the slide due to the resiliency of the parts 4 and the projections 5.

Figures 5 and 6 show side and front elevations of two connecting members 6 and 7 rigidly connected together which are stiffened by a corrugation 8.

In the further constructional form according to Figure 7 two connecting members 6 and 7 are connected together by a hinge 9.

Figures 8 and 9 show two connecting members 10 and 11 which are rotatably connected together. With this object as can be seen from Figure 9 which is a section on the line G—H of Figure 8, a rivet like neck 12 is formed from the material of the member 10, which holds the rotatable connecting member 11 fast. In order that the upstanding edge of the neck 12 shall not interfere with the introduction of bars into the member 11, the cross piece 13' of the member 11 is somewhat downwardly cranked as shown in Figure 8.

According to Figure 10 a flat plate 14 carrying a rotatable member 15, is hinged to the connecting member 13.

In the further constructional form according to Figure 11 two plates 16 hinged together are provided, each of which carries a rotatably mounted member 17 and 18.

According to Figure 12 a clip 20 is hinged to the connecting member 19. Instead of the clip 20 a casing or other jointing or connecting member might be used. Such connecting members might also be pivotally or otherwise attached to a member 19.

All the connecting members illustrated in the aforementioned drawing have holes 2, slits 3 and projections 5.

Figure 13 shows a bar on to which the aforementioned connecting members can be slid. The connecting member 1 and the bar 21 may be of any length. Preferably the lengths used are multiples of a definite normal length. Two holes 22 are provided in the bar 21, which agree in size with the holes of the slides.

Figure 14 shows a plate 23, which has tongues 25, the breadth of which corresponds to that of the bar 21 formed on its side edges by slits 24.

The square plate 26 provided with a hole 29 according to Figure 15 has tongues 28 formed on its side edges by slits 27 in a similar way to the rectangular plate 23 in Figure 14.

The size of the plates is so chosen that the lengths of the sides are a multiple of the width of the bars or the tongues, in addition to the breadth of the slits.

Figure 16 shows a disc 30 with a standard hole 31 and with four tongues 32 formed by slitting, on to which the connecting members can be fitted for example in order to attach arms on to the disc 30.

The pulley wheel illustrated in elevation and plan in Figures 17 and 18 consists of two discs 33 and 34 with tongues 32. The tongues 32 of each disc are arranged in staggered relation to each other. The discs 33 and 34 are connected together by the part 35, in which recesses 36 are provided, so that the connecting members can be pushed on to the tongues 32 unhindered by the part 35. The wheel which acts as a belt pulley could also be used as a gear wheel by inserting toothed segments 37 in to the space between the discs 33 and 34, as is indicated in dotted lines in Figures 17 and 18.

Figure 19 shows an arrangement corresponding to the building element of Figures 9 and 10, in which the base of each member 10' and 11' is lengthened to a tongue 38 intended to hold the building elements firmly. The tongue has a curved surface and is resilient.

Similarly in the other forms, the plates 14 and 16 and the connecting members might be extended to tongues 38. The tongues 38 lie with a certain locking power against the building elements pushed into the connecting members.

In Figures 20 and 21 a wedge 39 is illustrated in side and front elevation, which is used to key the shafts to the building elements. The wedge 29 has a flange 40 which is intended to lie against the surface of the building element.

With building elements according to the invention toy models of various forms and sizes can be easily and comfortably constructed, for example houses, cars, cranes, furniture and models of machines etc.

What I claim is:

1. A building element in the form of a C-shaped connecting member for bars, struts, plates and the like in constructional toys, the ends of the connecting member being formed with slits opening through said ends and said connecting member being formed with projections at the sides of the slits.

2. A building element in the form of a C-shaped connecting member for bars, struts, plates and the like in constructional toys, the ends of the member being formed with slits opening through said ends and terminating inwardly of the ends in apertures, the member being formed with projections at the sides of the slits.

3. A building element in the form of a C-shaped connecting member for bars, struts, plates and the like in constructional toys, the ends of the connecting member being formed with slits opening through the ends and inwardly merging into apertures, the member being formed at the sides of the slits with projections, the member including a base portion in the form of tongues serving to yieldingly press the constructional element inserted into the connecting member.

4. A building element of the type described, including a connecting member of C-form having a plate-like section formed with slits opening through the ends thereof and merging into apertures, the plate-like section being formed with projections on the sides of the slits, the member including tongue-like elements underlying and spaced from the plate-like section and serving to exert a yielding pressure on the constructional element with which the member cooperates.

5. A building element of the type defined, including a plurality of C-shaped connecting members formed with slits at the respective ends, with the slits merging into apertures, the members being formed with projections at the sides of the slits, and means for connecting two such members in rigid angular relation.

6. A building element of the type defined, including a plurality of C-shaped connecting members formed with slits at the respective ends, with the slits merging into apertures, the members being formed with projections at the sides of the slits, and means for connecting two of such members for relative pivotal movement.

7. A building element such as defined in claim 1, in combination with constructional toy elements slitted to form tongues to receive the connecting members.

OSCAR SCHWARZBACH.